(12) United States Patent
Akash et al.

(10) Patent No.: US 12,286,138 B2
(45) Date of Patent: Apr. 29, 2025

(54) ADAPTIVE TRUST CALIBRATION

(71) Applicant: Honda Motor Co., Ltd., Tokyo (JP)

(72) Inventors: Kumar Akash, Milpitas, CA (US);
Teruhisa Misu, San Jose, CA (US);
Zhaobo K. Zheng, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 191 days.

(21) Appl. No.: 18/077,904

(22) Filed: Dec. 8, 2022

(65) Prior Publication Data

US 2024/0190481 A1 Jun. 13, 2024

(51) Int. Cl.
*B60W 60/00* (2020.01)
*B60W 50/00* (2006.01)

(52) U.S. Cl.
CPC ...... *B60W 60/0054* (2020.02); *B60W 60/001* (2020.02); *B60W 2050/0075* (2013.01); *B60W 2554/4029* (2020.02)

(58) Field of Classification Search
CPC .......... B60W 60/0054; B60W 60/001; B60W 2050/0075; B60W 2554/4029; B60W 2050/0088
See application file for complete search history.

(56) References Cited

U.S. PATENT DOCUMENTS

| | | | |
|---|---|---|---|
| 10,759,424 B2 | 9/2020 | Misu et al. | |
| 11,430,231 B2 | 8/2022 | Takamoto | |
| 11,538,259 B2 * | 12/2022 | Martin | B60W 60/0015 |
| 11,577,722 B1 | 2/2023 | Packer et al. | |
| 12,005,922 B2 * | 6/2024 | Misu | G06F 30/27 |
| 2015/0149017 A1 | 5/2015 | Attard et al. | |
| 2015/0291146 A1 | 10/2015 | Prakah-Asante et al. | |
| 2017/0031364 A1 | 2/2017 | Takahashi et al. | |
| 2017/0039890 A1 * | 2/2017 | Truong | G09B 19/167 |
| 2017/0088143 A1 | 3/2017 | Goldman-Shenhar et al. | |
| 2017/0136842 A1 | 5/2017 | Anderson et al. | |
| 2017/0267256 A1 | 9/2017 | Minster et al. | |
| 2018/0361972 A1 | 12/2018 | Zagorski | |
| 2019/0071101 A1 * | 3/2019 | Emura | G05D 1/0088 |
| 2019/0094865 A1 | 3/2019 | Fletcher | |

(Continued)

OTHER PUBLICATIONS

Notice of Allowance of U.S. Appl. No. 17/510,284 dated Feb. 14, 2024, 7 pages.

(Continued)

*Primary Examiner* — Donald J Wallace
*Assistant Examiner* — Jalal C Coduroglu
(74) *Attorney, Agent, or Firm* — Rankin, Hill & Clark LLP

(57) ABSTRACT

According to one aspect, systems and techniques for adaptive trust calibration may include usage of a driving style predictor, including a memory and a processor. The memory may store one or more instructions and the processor may execute one or more of the instructions stored on the memory to perform one or more acts, actions, or steps, such as receiving a current automated vehicle (AV) driving style, receiving an indication of an event and an associated event type, receiving an indication of a driver takeover, concatenating the current AV driving style and one or more of the event type or the driver takeover to generate an input, and passing the input through a neural network, which may include a gated recurrent unit (GRU), to generate a preference change associated with the AV driving style.

20 Claims, 6 Drawing Sheets

(56) References Cited

U.S. PATENT DOCUMENTS

| | | | |
|---|---|---|---|
| 2019/0126914 A1* | 5/2019 | Nojoumian | G05D 1/0088 |
| 2019/0213429 A1 | 7/2019 | Sicconi et al. | |
| 2019/0291728 A1 | 9/2019 | Shalev-Shwartz et al. | |
| 2020/0216094 A1 | 7/2020 | Zhu et al. | |
| 2020/0369268 A1* | 11/2020 | McGill | B60W 40/04 |
| 2021/0078608 A1* | 3/2021 | Misu | G06N 7/01 |
| 2022/0126864 A1* | 4/2022 | Moustafa | G06T 1/0007 |
| 2022/0324449 A1 | 10/2022 | Shi | |
| 2022/0324481 A1* | 10/2022 | Cheng | B60W 60/0027 |
| 2022/0324490 A1 | 10/2022 | Akash et al. | |
| 2022/0343762 A1* | 10/2022 | Alvarez | B60W 50/14 |
| 2022/0388543 A1 | 12/2022 | David et al. | |
| 2022/0396287 A1* | 12/2022 | Akash | B60W 50/14 |
| 2023/0109398 A1 | 4/2023 | Kranski et al. | |
| 2023/0110713 A1 | 4/2023 | Degirmenci et al. | |
| 2023/0128456 A1* | 4/2023 | Natarajan | B60W 40/04 |
| | | | 701/23 |
| 2023/0309053 A1 | 9/2023 | Kennouche et al. | |
| 2023/0341825 A1 | 10/2023 | Dabija et al. | |
| 2024/0012992 A1 | 1/2024 | Tamm et al. | |
| 2024/0025404 A1 | 1/2024 | Gupta et al. | |
| 2024/0177528 A1* | 5/2024 | Olin | G07C 5/004 |

OTHER PUBLICATIONS

Notice of Allowance of U.S. Appl. No. 17/883,540 dated Oct. 28, 2024, 18 pages.

Office Action of U.S. Appl. No. 17/883,540 dated Jul. 25, 2024, 64 pages.

"Intelligent driver model." Wikipedia, Wikimedia Foundation, Published date Oct. 25, 2021 https://en.wikipedia.org/wiki/Intelligent_driver_model. Accessed date Oct. 25, 2021.

Shubham Agrawal and Srinivas Peeta. 2021. Evaluating the impacts of driver's pre-warning cognitive state on takeover performance under conditional automation. Transportation Research Part F: Traffic Psychology and Behaviour 83 (Nov. 2021), 80-98. https://doi.org/10.1016/J.TRF.2021.10.004.

Kumar Akash, Wan-Lin Hu, Neera Jain, and Tahira Reid. 2018. A Classification Model for Sensing Human Trust in Machines Using EEG and GSR. ACM Trans. Interact. Intell. Syst. 8, 4, Article 8, 4 (2018), 1-20. https://doi.org/10.1145/3132743.

Kumar Akash, Neera Jain, and Teruhisa Misu. 2020. Toward Adaptive Trust Calibration for Level 2 Driving Automation. In ICMI 2020—Proceedings of the 2020 International Conference on Multimodal Interaction. Association for Computing Machinery, Inc, Utrecht, 538-547. https://doi.org/10.1145/3382507.3418885.

Bradley M. Appelhans and Linda J. Luecken. 2006. Heart Rate Variability as an Index of Regulated Emotional Responding:. https://doi.org/10.1037/1089-2680.10.3.229 10, 3 (Sep. 2006), 229-240. https://doi.org/10.1037/1089-2680.10.3.229.

C. Basu, Q. Yang, D. Hungerman, M. Sinahal, and A. D. Dragan, "Do you want your autonomous car to drive like you?" in 2017 12th ACM/IEEE International Conference on Human-Robot Interaction (HRI. IEEE, 2017, pp. 417-425.

Bellem, H., Thiel, B., Schrauf, M. and Krems, J.F., 2018. Comfort in automated driving: An analysis of preferences for different automated driving styles and their dependence on personality traits. Transportation research part F: traffic psychology and behaviour, 55, pp. 90-100.

Hanna Bellem, Thorben Schönenberg, Josef F. Krems, and Michael Schrauf. 2016. Objective metrics of comfort: Developing a driving style for highly automated vehicles. Transportation Research Part F: Traffic Psychology and Behaviour 41 (Aug. 2016), 45-54. https://doi.org/10.1016/J.TRF.2016.05.005.

Stephen M. Casner, Edwin L. Hutchins, and Don Norman. 2016. The challenges of partially automated driving. Commun. ACM 59, 5 (2016), 70-77. https://doi.org/10.1145/2830565.

Liang-Chieh Chen, Yukun Zhu, George Papandreou, Florian Schroff, and Hartwig Adam. 2018. Encoder-Decoder with Atrous Separable Convolution for Semantic Image Segmentation. In In Proceedings of the European conference on computer vision (ECCV). Springer Science & Business Media, Munich, 81-818. https://github.com/tensorflow/models/tree/master/.

J. K. Choi and Y. G. Ji, "Investigating the importance of trust on adopting an autonomous vehicle," International Journal of Human-Computer Interaction, vol. 31, No. 10, pp. 692-702, 2015. [Online]. Available: https://doi.org/10.1080/10447318.2015.1070549.

N. Dillen, M. Ilievski, E. Law, L. E. Nacke, K. Czarnecki, and O. Schneider, "Keep calm and ride along: Passenger comfort and anxiety as physiological responses to autonomous driving styles," in Proceedings of the 2020 CHI conference on human factors in computing systems, 2020, pp. 1-13.

Epic Games. 2022. Unreal Engine. https://www.unrealengine.com/en-US/.

A. Eugensson, M. Brannstrom, D. Frasher, M. Rothoff, S. Solyom, and A. Robertsson, "Environmental, safety legal and societal implications of autonomous driving systems," in International Technical Conference on the Enhanced Safety of Vehicles (ESV). Seoul, South Korea, vol. 334, 2013.

Yannick Forster, Johannes Kraus, Sophie Feinauer, and Martin Baumann. 2018. Calibration of trust expectancies in conditionally automated driving by brand, reliability information and introductionary videos: An online study. In Proceedings—10th International ACM Conference on Automotive User Interfaces and Interactive Vehicular Applications, AutomotiveUI 2018. Association for Computing Machinery, Inc, Pittsburgh, 118-128. https://doi.org/10.1145/3239060.3239070.

Sabu George, Manohara Pai, Radhika M Pai, and Samir Kumar Praharaj. 2017. Eye blink count and eye blink duration analysis for deception detection; Eye blink count and eye blink duration analysis for deception detection. IEEE, Udupi, 23-229. https://doi.org/10.1109/ICACCI.2017.8125844.

Brano Glumac and François Des Rosiers. 2020. Practice briefing-Automated valuation models (AVMs): their role, their advantages and their limitations. Journal of Property Investment&Finance 39, 5 (2020), 481-491. https://doi.org/10.1108/JPIF-07-2020-0086.

C. Gold, M. Korber, C. Hohenberger, D. Lechner, and K. Bengler, "Trust in automation—before and after the experience of take-over scenarios in a highly automated vehicle," Procedia Manufacturing, vol. 3, pp. 3025-3032, 2015.

Stefan Griesche Bosch, Mandy Dotzauer, Stefan Griesche, Enc Nicolay, Dirk Assmann, and David Käthner. 2016. Should my car drive as I do? What kind of driving style do drivers prefer for the design of automated driving functions? Should my car drive as I do? What kind of driving style do drivers prefer for the design of automated driving functions? Soll mein Aut. raunschweiger Symposium 10, 11 (2016), 185-204. https://www.researchgate.net/publication/294087276.

Franziska Hartwich, Matthias Beggiato, and Josef F Krems. "Driving Comfort, Enjoyment, and Acceptance of Automated Driving—Effects of Drivers' Age and Driving Style Familiarity." Ergonomics, vol. 61, No. 8, pp. 1017-1032, 2018. https://doi.org/10.1080/00140139.2018.1441448.

M. Hasenjager and H. Wersing, "Personalization in advanced driver assistance systems and autonomous vehicles: A review," in 2017 IEEE 20th International Conference on Intelligent Transportation Systems (ITSC), 2017, pp. 1-7.

Hoffmann, Gabriel M., Claire J. Tomlin, Michael Montemerlo, and Sebastian Thrun. "Autonomous Automobile Trajectory Tracking for Off-Road Driving: Controller Design, Experimental Validation and Racing." American Control Conference. 2007, pp. 2296-2301. doi:10.1109/ACC.2007.4282788 http:/ai.stanford.edu/~gabeh/papers/hoffmann_stanley_control07.pdf.

Jesper F. Hopstaken, Dimitri van der Linden, Arnold B. Bakker, and Michiel A.J. Kompier. 2015. The window of my eyes: Task disengagement and mental fatigue covary with pupil dynamics. Biological Psychology 110 (Sep. 2015), 100-106. https://doi.org/10.1016/J.BIOPSYCHO.2015.06.013.

Zhongxu Hu, Chen Lv, Peng Hang, Chao Huang, and Yang Xing. 2021. Data-driven Estimation of Driver Attention using Calibration-free Eye Gaze and Scene Features. IEEE Transactions on Industrial Electronics 69, 2 (2021), 1800-1808. https://doi.org/10.1109/TIE.2021.3057033.

(56) References Cited

OTHER PUBLICATIONS

A. Kesting, M. Treiber, M. Schonhof, and D. Helbing, "Extending adaptive cruise control to adaptive driving strategies," Transportation Research Record, vol. 2000, No. 1, pp. 16-24, 2007. [Online]. Available: https://doi.org/10.3141/2000-03.
Keunwoo Kim, Minjung Park, and Youn Kyung Lim. 2021. Guiding Preferred Driving Style Using Voice in Autonomous Vehicles: An On-Road Wizard-of-Oz Study. In Designing Interactive Systems Conference 2021. Association for Computing Machinery, Inc, Virtual, 352-364. https://doi.org/10.1145/3461778.3462056.
Victor L. Knoop, Meng Wang, Isabel Wilmink, D. Marika Hoedemaeker, Mark Maaskant, and Evert Jeen Van der Meer. 2019. Platoon of SAE Level-2 Automated Vehicles on Public Roads: Setup, Traffic Interactions, and Stability. Transportation Research Record 9 (2019), 311-322. https://doi.org/10.1177/0361198119845885.
Körber, M., Baseler, E. and Bengler, K., 2018. Introduction matters: Manipulating trust in automation and reliance in automated driving. Applied ergonomics,66, pp. 18-31.
R. Krueger, T. H. Rashidi, and J. M. Rose, "Preferences for shared autonomous vehicles," Transportation Research Part C: Emerging Technologies, vol. 69, pp. 343-355, 2016.
Lee, J.D., Liu, S.Y., Domeyer, J. and DinparastDjadid, A. "Assessing drivers' trust of automated vehicle driving styles with a two-part mixed model of intervention tendency and magnitude." Human Factors, vol. 63, No. 2, pp. 197-209, 2021. p. 0018720819880363.
John D. Lee and Katrina A. See. "Trust in Automation: Designing for Appropriate Reliance." Human Factors, vol. 46, No. 1, pp. 50-80, 2004.
David G. Lowe. 2004. Distinctive Image Features from Scale-Invariant Keypoints. International Journal of Computer Vision 2004 60:2 60, 2 (Nov. 2004), 91-110. https://doi.org/10.1023/B:VISI.0000029664.99615.94.
Ma, Z. and Zhang, Y., Dec. 2020. Investigating the Effects of Automated Driving Styles and Driver's Driving Styles on Driver Trust, Acceptance, and Take Over Behaviors. In Proceedings of the Human Factors and Ergonomics Society Annual Meeting (vol. 64, No. 1, pp. 2001-2005). Sage CA: Los Angeles, CA: Sage Publications.
Zheng Ma and Yiqi Zhang. 2021. Drivers trust, acceptance, and takeover behaviors in fully automated vehicles: Effects of automated driving styles and driver's driving styles. Accident Analysis & Prevention 159 (Sep. 2021), 106238. https://doi.org/10.1016/J.AAP.2021.106238.
Marius Muja and David G Lowe. 2009. Fast Approximate Nearest Neighbors With Automatic Algorithm Configuration. Visapp 1, 2 (2009), 331-340.
Manisha Natarajan, Kumar Akash, and Teruhisa Misu. "Toward Adaptive Driving Styles for Automated Driving with Users' Trust and Preferences." in Proceedings of the 2022 ACM/IEEE International Conference on Human-Robot Interaction, ser. HRI '22. IEEE Press, 2022, p. 940-944.
Fabian Pedregosa, Gael Varoquaux, Alexandre Gramfort, Vincent Michel, Bertrand Thirion, Olivier Grisel, Mathieu Blondel, Peter Prettenhofer, Ron Weiss, Vincent Dubourg, Jake Vanderplas, Alexandre Passos, David Cournapeau, Matthieu Brucher, Matthieu Perrot, and Edouard Duchesnay. 2011. Scikit-learn: Machine learning in Python. Journal of Machine Learning Research 12 (2011), 2825-2830.
Rachel Phinnemore, Gabriele Cimolino, Pritam Sarkar, Ali Etemad, and T. C.Nicholas Graham. 2021. Happy Driver: Investigating the Effect of Mood on Preferred Style of Driving in Self-Driving Cars. In In Proceedings of the 9th International Conference on Human-Agent Interaction. ACM, Virtual, 139-147. https://doi.org/10.1145/3472307.3484169.
PPS. 2022. TactileGlove. https://pressureprofile.com/body-pressure-mapping/tactile-glove.
Christina M. Rudin-Brown and Heather A. Parker. 2004. Behavioural adaptation to adaptive cruise control (ACC): Implications for preventive strategies. Transportation Research Part F: Traffic Psychology and Behaviour 7, 2 (Mar. 2004), 59-76. https://doi.org/10.1016/J.TRF.2004.02.001.
SAE. 2018. Taxonomy and Definitions for Terms Related to Driving Automation Systems for On-Road Motor Vehicles—SAE International. https://www.sae.org/standards/content/j3016_201806/.
Shimmer. 2022. Shimmer3 GSR+ Unit. https://shimmersensing.com/product/shimmer3-gsr-unit/.
Sónia Soares, António Lobo, Sara Ferreira, Liliana Cunha, and António Couto. 2021. Takeover performance evaluation using driving simulation: a systematic review and meta analysis. European Transport Research Review 13 (2021), 1-18. https://doi.org/10.1186/s12544-021-00505-2.
Julia Trabulsi, Kian Norouzi, Seidi Suurmets, Mike Storm, and Thomas Zoëga Ramsøy. 2021. Optimizing Fixation Filters for Eye-Tracking on Small Screens. Frontiers in Neuroscience 15 (Nov. 2021), 1257. https://doi.org/10.3389/FNINS.2021.578439/BIBTEX.
Tobii. 2022. Tobii Pro Glasses 3. https://www.tobiipro.com/product-listing/tobii-pro-glasses-3/.
Treiber, Martin; Hennecke, Ansgar; Helbing, Dirk (2000), "Congested traffic states in empirical observations and microscopic simulations", Physical Review E,62(2): 1805-1824. (https://en.wikipedia.org/wiki/Intelligent_driver_model).
Treiber, M. and Kesting, A., 2013. Traffic flow dynamics. Traffic Flow Dynamics: Data, Models and Simulation, Springer-Verlag Berlin Heidelberg.
Walker, F., Verwey, W. and Martens, M., Jun. 2018. Gaze behaviour as a measure of trust in automated vehicles. In Proceedings of the 6th Humanist Conference (Jun. 2018).
Ekman, F., Johansson, M., Karlsson, M., Strömberg, H. and Bligård, L.O., 2021. Trust in what? Exploring the interdependency between an automated vehicle's driving style and traffic situations. Transportation research part F: traffic psychology and behaviour, 76, pp. 59-71.
Ekman, F., Johansson, M., Bligård, L.O., Karlsson, M. and Strömberg, H., 2019. Exploring automated vehicle driving styles as a source of trust information. Transportation research part F: traffic psychology and behaviour,65, pp. 268-279.
N. Adnan, S. Md Nordin, M. A. bin Bahruddin, and M. Ali, "How trust can drive forward the user acceptance to the technology? Invehicle technology for autonomous vehicle," Transportation Research Part A: Policy and Practice, vol. 118, pp. 819-836, 2018. [Online]. Available: https://www.sciencedirect.com/science/article/pii/S0965856418309030.
F. Chollet et al., "Keras," 2015. https://keras.io/.
A. Dettmann, F. Hartwich, P. Roßner, M. Beggiato, K. Felbel, J. Krems, and A. C. Bullinger, "Comfort or not? Automated driving style and user characteristics causing human discomfort in automated driving," International Journal of Human-Computer Interaction, vol. 37, No. 4, pp. 331-339, 2021. [Online]. Available: https://doi.org/10.1080/10447318.2020.1860518.
L. Kleisen, The relationship between thinking and driving styles and their contribution to young driver road safety. University of Canberra Bruce, Australia, 2011.
D. Vaughan, Sep. 2022. [Online]. Available: https://cran.r-project.org/web/packages/yardstick/vignettes/multiclass.html.
J. L. Andreassi, Psychophysiology: Human behavior and physiological response. Psychology Press, 2010.
S. E. Baek, H. S. Kim, and M. Han, "Personalized speed planning algorithm using a statistical driver model in car-following situations," International Journal of Automotive Technology, vol. 23, No. 3, pp. 829-840, 2022.
T. Chen, S. Kornblith, M. Norouzi, and G. Hinton, "A simple framework for contrastive learning of visual representations," in International conference on machine learning. PMLR, 2020, pp. 1597-1607.
D. Chicco, "Siamese neural networks: An overview," Artificial Neural Networks, pp. 73-94, 2021.
D. Chung, K. Tahboub, and E. J. Delp, "A two stream siamese convolutional neural network for person re-dentification," in Proceedings of the IEEE international conference on computer vision, 2017, pp. 1983-1991.
E. de Gelder, I. Cara, J. Uittenbogaard, L. Kroon, S. van Iersel, and J. Hogema, "Towards personalised automated driving: Prediction of

(56) References Cited

OTHER PUBLICATIONS preferred acc behaviour based on manual driving," in 2016 IEEE Intelligent Vehicles Symposium (IV). IEEE, 2016, pp. 1211-1216.
N. Du, F. Zhou, E. M. Pulver, D. M. Tilbury, L. P. Robert, A. K. Pradhan, and X. J. Yang, "Examining the effects of emotional valence and arousal on takeover performance in conditionally automated driving," Transportation research part C: emerging technologies, vol. 112, pp. 78-87, 2020.
J. B. Greenblatt and S. Shaheen, "Automated vehicles, on-demand mobility, and environmental impacts," Current sustainable/renewable energy reports, vol. 2, No. 3, pp. 74-81, 2015.
W. Hayale, P. Negi, and M. Mahoor, "Facial expression recognition using deep siamese neural networks with a supervised loss function," in 2019 14th IEEE International Conference on Automatic Face & Gesture Recognition (FG 2019). IEEE, 2019, pp. 1-7.
S.-C. Hsiao, D.-Y. Kao, Z.-Y. Liu, and R. Tso, "Malware image classification using one-shot learning with siamese hetworks," Procedia Computer Science, vol. 159, pp. 1863-1871, 2019.
S.-A. Kaye, S. Nandavar, S. Yasmin, I. Lewis, and O. Oviedo-Trespalacios, "Consumer knowledge and acceptance of advanced driver assistance systems," Transportation Research Part F: Traffic Psychology and Behaviour, vol. 90, pp. 300-311, 2022.
D. P. Kingma and J. Ba, "Adam: A method for stochastic optimization," arXiv preprint arXiv:1412.6980, 2014.
V. K. Kukkala, J. Tunnell, S. Pasricha, and T. Bradley, "Advanced driver-assistance systems: A path toward autonomous vehicles," IEEE Consumer Electronics Magazine, vol. 7, No. 5, pp. 18-25, 2018.
C. Lee, B. Seppelt, B. Reimer, B. Mehler, and J. F. Coughlin, "Acceptance of vehicle automation: Effects of demographic traits, technology experience and media exposure," in Proceedings of the Human Factors and Ergonomics Society Annual Meeting, vol. 63. Sage Publications Sage CA: Los Angeles, CA, 2019, pp. 2066-2070.
Y. Y. Lee, M. Dong, V. Krishnamoorthy, K. Akash, Z. Zheng, T. Misu, and G. Huang, "The impacts of adaptive driving styles on trust in level 2 automated vehicles," in Proceedings of the Human Factors and Ergonomic Society annual meeting, vol. 66, No. 1. Sage Publishing, 2022, pp. 345-345.
B. C. Lee and V. G. Duffy, "The effects of task interruption on human performance: A study of the systematic classification of human behavior and interruption frequency," Human Factors and Ergonomics in Manufacturing & Service Industries, vol. 25, No. 2, pp. 137-152, 2015.
S. Mai, H. Hu, and S. Xing, "Divide, conquer and combine: Hierarchical feature fusion network with local and global perspectives for multimodal affective computing," in Proceedings of the 57th annual meeting of the association for computational linguistics, 2019, pp. 481-492.
B. Moradi, "The new optimization algorithm for the vehicle routing problem with time windows using multi-objective discrete learnable evolution model," Soft Computing, vol. 24, No. 9, pp. 6741-6769, 2020.
I. Nastjuk, B. Herrenkind, M. Marrone, A. B. Brendel, and L. M. Kolbe, "What drives the acceptance of autonomous driving? an investigation of acceptance factors from an end-user's perspective," Technological Forecasting and Social Change, vol. 161, p. 120319, 2020.

Y. Niu, D. Kong, R. Wen, Z. Cao, and J. Xiao, "An improved learnable evolution model for solving multi-objective vehicle routing problem with stochastic demand," Knowledge-Based Systems, vol. 230, p. 107378, 2021.
Z. Sajedinia, K. Akash, Z. Zheng, T. Misu, M. Dong, V. Krishnamoorthy, K. Martinez, K. Sureshbabu, and G. Huang, "Investigating users' preferences in adaptive driving styles for level 2 driving automation," in 14th International Conference on Automotive User Interfaces and Interactive Vehicular Applications, 2022, pp. 162-170.
Jarrod M Snider, "Automatic Steering Methods for Autonomous Automobile Path Tracking", Feb. 2009, Carnegie Mellon University (Year. 2009).
M. Teste, A. Broutin, M. Marty, M. C. Valera, F. Soares Cunha, and E. Noirrit-Esclassan. 2021. Toothbrushing in children with autism spectrum disorders: qualitative analysis of parental difficulties and solutions in France. European Archives of Paediatric Dentistry 22, 6 (2021), 1049-1056. https://doi.org/10.1007/s40368-021-00640-3.
A. Ullah, K. Muhammad, K. Haydarov, I. U. Haq, M. Lee, and S. W. Baik, "One-shot learning for surveillance anomaly recognition using siamese 3d cnn," in 2020 International Joint Conference on Neural Networks (IJCNN). IEEE, 2020, pp. 1-8.
F. Wang and H. Liu, "Understanding the behaviour of contrastive loss," in Proceedings of the IEEE/CVF conference on computer vision and pattern recognition, 2021, pp. 2495-2504.
L. Yue, M. Abdel-Aty, Y. Wu, and L. Wang, "Assessment of the safety benefits of vehicles' advanced driver assistance, connectivity and low level automation systems," Accident Analysis & Prevention, vol. 117, pp. 55-64, 2018.
N. Zeghidour, G. Synnaeve, N. Usunier, and E. Dupoux, "Joint learning of speaker and phonetic similarities with siamese networks." in Interspeech, 2016, pp. 1295-1299.
C. Zhang, W. Liu, H. Ma, and H. Fu, "Siamese neural network based gait recognition for human identification," in 2016 ieee international conference on acoustics, speech and signal processing (ICASSP). IEEE, 2016, pp. 2832-2836.
Z. Zheng, K. Akash, T. Misu, V. Krishnamoorthy, M. Dong, Y. Lee, and G. Huang, "Identification of adaptive driving style preference through implicit inputs in sae 12 vehicles," in Proceedings of the 2022 International Conference on Multimodal Interaction, 2022, pp. 468-475.
Z. K. Zheng, J. E. Staubitz, A. S. Weitlauf, J. Staubitz, M. Pollack, L. Shibley, M. Hopton, W. Martin, A. Swanson, P. Juárez, et al., "A predictive multimodal framework to alert caregivers of problem behaviors for children with asd (premac)," Sensors, vol. 21, No. 2, p. 370, 2021.
Z. K. Zheng, K. Akash, and T. Misu, "Detection of perceived discomfort in sae 12 automated vehicles through driver takeovers and physiological spikes," in 2022 IEEE 25th International Conference on Intelligent Transportation Systems (ITSC). IEEE, 2022, pp. 1717-1722.
K. H. Zou, J. R. Fielding, S. G. Silverman, and C. M. Tempany, "Hypothesis testing i: proportions," Radiology, vol. 226, No. 3, pp. 609-613, 2003.
Office Action of U.S. Appl. No. 17/510,284 dated Jul. 28, 2023, 24 pages.

* cited by examiner

ADAPTIVE TRUST CALIBRATION

BACKGROUND

Advances in automated driving systems have now made it possible for autonomous vehicles (AVs) to operate autonomously without human inputs or even supervision. Developing more advanced autonomous driving technologies has promise to provide a secure and comfortable driving experience as well as potentially contribute to a socially and environmentally sustainable future. However, the impact of these potential benefits depends on the adoption of these technologies. For user acceptance, which may correlate to their trust on the system, these vehicles should be reliable and account for a user's comfort. However, preference and perception of comfort may vary significantly across users, and even vary within a single user, depending on the mental state of the user and the situation.

BRIEF DESCRIPTION

According to one aspect, a system for adaptive trust calibration may include a driving style predictor. The driving style predictor may include a memory and a processor. The memory may store one or more instructions. The processor may execute one or more of the instructions stored on the memory to perform one or more acts, actions, or steps, such as receiving a current automated vehicle (AV) driving style, receiving an indication of an event and an associated event type, concatenating the current AV driving style and the event type to generate an input, and passing the input through a neural network to generate a preference change associated with the AV driving style.

The system for adaptive trust calibration may include a driving style controller, implementing the preference change and generating an updated AV driving style. The system for adaptive trust calibration may include a driving automation controller operating an AV by implementing the updated AV driving style. The driving automation controller may include a Stanley controller generating a steering output based on the event. The driving automation controller may include an intelligent driver model (IDM) controller generating throttle and brake outputs based on the event.

The processor may receive an indication of a driver takeover. The processor may concatenate the current AV driving style, the event type, and the driver takeover to generate the input. The neural network may be a recurrent neural network or a gated recurrent unit (GRU). The driving style predictor may be initialized based on an initial AV driving style, an initial event and an associated initial event type, an indication of an initial driver takeover, or an initial preference change. The initial preference change may be received as a user input.

According to one aspect, a system for adaptive trust calibration may include a driving style predictor. The driving style predictor may include a memory and a processor. The memory may store one or more instructions. The processor may execute one or more of the instructions stored on the memory to perform one or more acts, actions, or steps, such as receiving a current automated vehicle (AV) driving style, receiving an indication of a driver takeover, concatenating the current AV driving style and the driver takeover to generate an input, and passing the input through a neural network to generate a preference change associated with the AV driving style.

The system for adaptive trust calibration may include a driving style controller, implementing the preference change and generating an updated AV driving style. The system for adaptive trust calibration may include a driving automation controller operating an AV by implementing the updated AV driving style. The driving automation controller may include a Stanley controller generating a steering output based on a detected event and an intelligent driver model (IDM) controller generating throttle and brake outputs based on the detected event.

According to one aspect, a method for adaptive trust calibration may include receiving a current automated vehicle (AV) driving style, receiving an indication of an event and an associated event type or receiving an indication of a driver takeover, concatenating the current AV driving style and one or more of the event type or the driver takeover to generate an input, and passing the input through a neural network to generate a preference change associated with the AV driving style.

The method for adaptive trust calibration may include implementing the preference change and generating an updated AV driving style, operating an AV by implementing the updated AV driving style, generating a steering output based on the event, and generating throttle and brake outputs based on the event. The event type may be one of a pedestrian related event or a vehicle related event.

DETAILED DESCRIPTION

Figure 1:
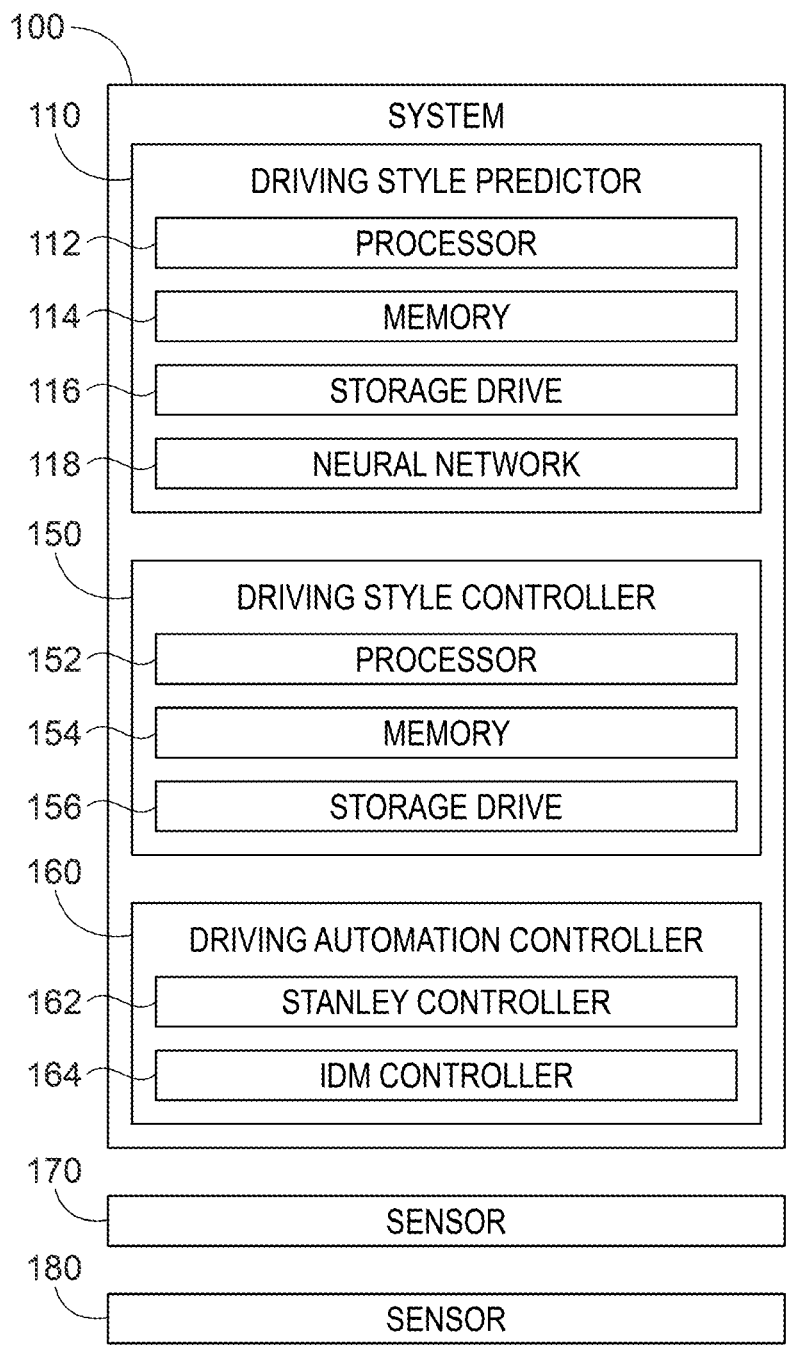
FIG. 1 is an exemplary component diagram of a system for adaptive trust calibration, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, and/or driving. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

One factor to optimal acceptance and comfort of automated vehicle features may be the driving style of the automation. Mismatches between the automated vehicle and the driver-preferred driving styles may cause drivers to take over more frequently or disable the automation features. A framework that adaptively changes the driving style of driving automation to match the driver's preference is provided herein. A driving preference prediction model may be developed to identify the change in preferred driving styles. Using this model, development and validation of an implicit adaptation of the driving style algorithm to minimize the driving style preference mismatch may be achieved.

A primary aspect for perceived comfort is an automated vehicle (AV) driving style. Drivers may have different preferences in driving; some drivers prefer a more defensive (e.g., lower speed, more distance with other objects), and some prefer a more aggressive (e.g., higher speed, less distance with other objects) driving experience. Even during one course of driving, this preference might change based on different factors such as changes in trust, scenario, and experience of the driver.

For advanced driving assist systems, adaptation and personalization may be classified into two different types: explicit and implicit adaptation. Explicit adaptation requests users to state their preferences by selecting the optimal system option. For example, drivers may adjust the distance from the leading vehicle in the current adaptive cruise control (ACC) systems. Although such an adaptive system gives users direct control, users have to actively select the option. One disadvantage of explicit adaptation include increased user workload, and non-preferred driving style experience before converging to a final selection. Implicit adaptation, on the other hand, does not openly ask users for their preferences, but instead observes their behaviors and determines the preference.

However, this requires the system to predict their preference and appropriately adapt the driving style. A prediction model for preference of the driver in different scenarios of adaptive driving style based on dynamic information, such as user's takeover, road scene, and current aggressiveness of the vehicle may achieve the benefits and advantages of better user acceptance and comfort.

Explicit and implicit driving style adaptations algorithms to reduce driver's preference mismatch and increase trust in automation are provided herein.

FIG. 1 is an exemplary component diagram of a system 100 for adaptive trust calibration, according to one aspect. The system 100 for adaptive trust calibration may include a driving style predictor 110, a driving style controller 150, a driving automation controller 160, and one or more sensors 170, 180 which may be communicatively coupled and/or in computer communication with one another. According to one aspect, the driving style predictor 110 may be remote from an associated AV.

The sensors 170, 180 may receive or detect information pertaining to an autonomous vehicle, a surrounding environment, one or more associated scenarios, one or more associated events, etc. The sensors 170, 180 may be image capture devices, radar sensors, Lidar sensors, proximity sensors, another type of sensor, etc. According to one aspect, the sensors 170, 180 may be located on mobile devices and may receive or detect information remote from the system 100 for adaptive trust calibration and transmit this information to the system 100 for adaptive trust calibration.

A user's driving preference for an automated vehicle (AV) may depend on a variety of factors, such as personal driving style, driving styles of neighboring vehicles, a current driving scenario, scene context, trust for the AV, etc.

The driving style predictor 110 may generate a preference change associated with the current AV driving style. In other words, the preference change generated by the driving style predictor 110 may be indicative of an estimation or a prediction of how the system assumes a user or occupant would prefer the AV to drive or operate in an autonomous manner.

In this regard, the driving style predictor 110 may include a processor 112, a memory 114, a storage drive 116, and a neural network 118. The memory 114 may store one or more instructions. The processor 112 may execute one or more of the instructions stored on the memory 114 to perform one or more acts, actions, or steps.

According to one aspect, the driving style predictor 110 may be initialized based on an initial automated vehicle (AV) driving style, an initial event and an associated initial event type, an indication of an initial driver takeover, or an initial preference change. One or more aspects of the driving style predictor 110 initialization may be received as a user input (e.g., which may be received as a response to a question about preferencing, more aggressively, more defensively, etc.). This user input may be an explicit personalization, such as where users state their preferences to explicitly change the system, where the system restricts the user's choice to system offers, etc.

According to one aspect, the processor 112 may perform receiving a current automated vehicle (AV) driving style, receiving an indication of an event and an associated event type, and/or receiving an indication of a driver takeover.

The event type may be one of a pedestrian related event or a vehicle related event. A pedestrian related event may be associated with a pedestrian at a pedestrian crossing at a crosswalk, intersection, roadway, etc. A vehicle related event may be associated with a stop sign (e.g., two-way stop, three-way stop, four-way stop, etc.), a traffic light, a left turn, a right turn, a right turn at a stop sign or traffic light, one or more vehicles in the surrounding environment, following a leader vehicle, yielding, etc.

The indication of the driver takeover may be received when the occupant or driver presses the throttle pedal or the brake pedals during AV autonomous operation. According to one aspect, the AV may resume control once input to both the throttle and brake are absent for a predetermined amount of time. When the occupant or driver presses the throttle pedal or the brake pedals during AV autonomous operation, a takeover$_{brake}$ flag or a takeover$_{throttle}$ flag may be associated with the event.

In any event, the processor 112 of the driving style predictor 110 may concatenate two or more of these received parameters to generate an input to the neural network. For example, the processor 112 may concatenate the current AV driving style and the event type to generate the input, concatenate the current AV driving style and the driver takeover to generate the input, or concatenate the current AV driving style, the event type, and the driver takeover to generate the input. In this way, two or more of the received parameters may be concatenated to generate the input for the neural network. This concatenation may be a representation indicative of a state of an occupant or user of the AV. According to one aspect, additional parameters may be provided and as many concatenated as provided.

The processor 112 may pass the input through the neural network to generate a preference change associated with the AV driving style. This preference change may be an implicit personalization which is not directly asked of users and is instead derived or built based on observed behavior and may be derived as a user model for the prediction of user preferences or behavior based on observed user data. The neural network may be a recurrent neural network (RNN), a gated recurrent unit (GRU), may include a time series model, a long short-term memory (LSTM) model, or other dynamic models. While recurrent neural networks are described herein, any type of neural network may be utilized. The GRU is described herein may be utilized due to its consideration of previous history as well as the prediction.

The driving style controller 150 may generally implement the preference change and generate an updated AV driving style or otherwise control the level of aggressiveness or defensiveness to maximize the probability that the participant enjoys the current AV driving style. The driving style controller 150 may include a processor 152, a memory 154, and a storage drive 156. The driving automation controller 160 may be any driving automation controller 160 and may operate the AV by implementing the updated AV driving style.

The driving automation controller 160 may include a Stanley controller 162 and/or an intelligent driver model (IDM) controller 164. The Stanley controller 162 may generate a steering output based on the above discussed event. The IDM controller 164 may generate the throttle and brake outputs based on the event. According to one aspect, parameters associated with the IDM controller 164 may be varied to provide different levels of aggressiveness or defensiveness (e.g., Highly Defensive (HD), Less Defensive (LD), Less Aggressive (LA), Highly Aggressive (HA)). These driving styles vary on driving parameters such as headway, acceleration and minimum distance to decelerate (MDD). While four exemplary levels of aggressiveness or defensiveness are discussed, any number of levels of aggressiveness or defensiveness may be utilized. For the four sessions of adaptive driving styles, two may include trust-based adaptation and the other two may include preference-based adaptation.

The trust-based heuristic may help reduce preference mismatch and maintain high trust, when starting with an aggressive driving style. Moreover, trust-based heuristic may maintain the same mismatch if starting with defensive, but will result in lower trust. Therefore, an implicit adaptation method that may predict the preference for the upcoming event may help to mitigate mismatching.

Figure 2:
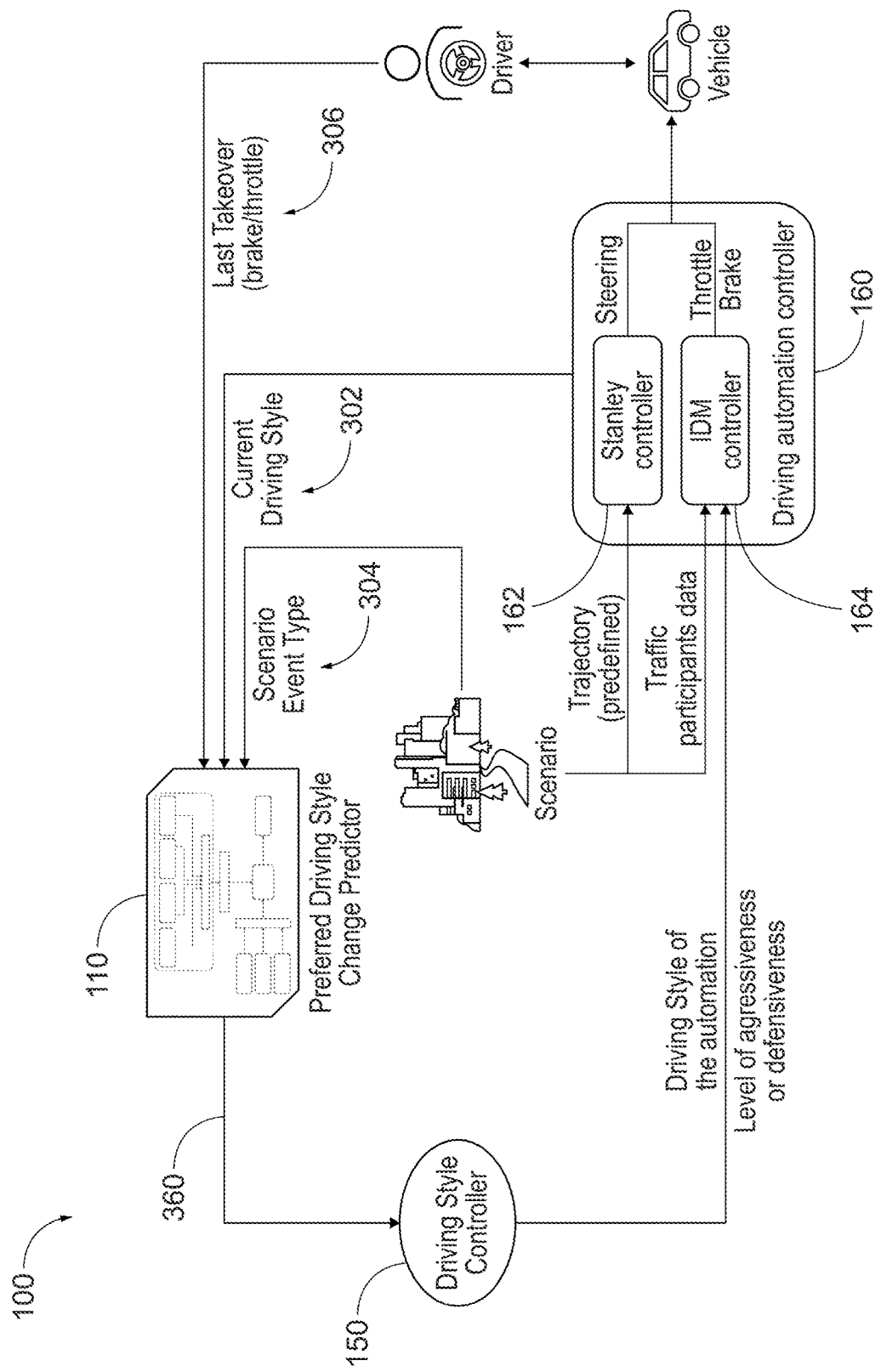
FIG. 2 is an exemplary component diagram of a system for adaptive trust calibration, according to one aspect.

FIG. 2 is an exemplary component diagram of a system 100 for adaptive trust calibration, according to one aspect. Two or more of a current AV driving style 302, an indication of an event and an associated event type 304, or an indication of a driver takeover 306 may be received by the processor of the driving style predictor 110 or the preferred driving style change predictor. As discussed above, the driving style predictor 110 may generate a preference change associated with the AV driving style based on the current AV driving style 302, the indication of an event and an associated event type 304, and/or the indication of a driver takeover 306. This preference change may be passed to the driving style controller 150 and the driving style controller 150 may implement the preference change and generate an updated AV driving style based on the received preference change from the driving style predictor 110.

Thereafter, the driving automation controller 160 may generate the current driving style based on information from the sensors 170, 180 indicative of a trajectory of the AV and information from the sensors 170, 180 indicative of other traffic participants within the operating environment (e.g., driving environment, including traffic lights, other vehicles, pedestrians, stop signs, roundabouts, etc.) and from the driving style (e.g., the updated AV driving style) generated by the driving style controller 150. Additionally, the driving automation controller 160 may monitor the AV for any indications of takeovers from the occupants of the AV via a controller area network (CAN) bus from the AV. In this way, a feedback loop may be created and mitigation or minimization of driving style mismatches may be provided. Although the driving automation controller 160 of FIG. 2 includes the Stanley controller 162 and the IDM controller 164, other types of driving automation controller 160s may be utilized.

To develop an implicit driving style adaptation, a model may be trained based on the data collected to predict the users' preference. The AV's current level of driving style (HD, LD, LA, or HD), current event type (vehicle event or pedestrian event), and user's takeover response in the last event (whether the user pressed brake, pressed throttle, or did not takeover) may be input to the model. Since the trust and preference behavior may be dynamic, a gated recurrent unit (GRU) may be implemented to capture the dynamically evolving behavior. A relatively small model structure with limited number of parameters may be used to mitigate over-fitting and to ensure convergence with the limited size of data. Furthermore, to capture some aspect of individual differences across users, the initial states of the GRU may be calculated based on the initial situation and the corresponding preference change response of a user. According to one aspect, merely the first preference change response in a drive may be used to initialize the model for prediction and the rest of the responses may be utilized for analysis later.

During initial training, participants with incomplete data were removed and the model may be trained using the entire dataset for the closed-loop control for the implicit driving style adaptation. The trained model may continuously predict the probability of the driving style preference change for the three classes: drive defensively, drive the same, and drive aggressively.

The system may mitigate the driving style preference mismatch against the change of both traffic situation and user preference. Therefore, an algorithm that maximizes the likelihood of participants responding 'drive the same' effectively achieves the objective. For an event number $k \in [1,8]$, let $s_k \in \{HA, LA, LD, HD\}$ denote the driving style of the AV, $e_k \in \{$pedestrian event, vehicle event$\}$ denote the event type, and $t_k \in \{$brake, no takeover, throttle$\}$ denote whether the participant takeover the AV. Therefore, the trained model predicts the likelihood of a participant's preference change $\Delta s_k \in \{$drive defensively, drive the same, drive aggressively$\}$ given $s_k$, $e_k$, $t_{k-1}$, i.e., $p(\Delta s_k | s_k, e_k, t_{k-1})$. Since the event type may be associated with the presence of pedestrians and vehicles, it may be fair to assume that event type is observable in most cases a priori. Therefore, at an event number k with known event $e_k$, using this model, the optimal choice of driving style $s_k^{opt}$ for the AV is:

$$s_k^{opt} = _{s_k}^{argmax} p(\Delta s_k = \text{drive the same} | s_k, e_k, t_{k-1}).$$

A control policy that adapts the driving style of the AV based on this optimal driving style $s^{opt}$ may potentially improve the users' interaction experience and comfort. The algorithm may be enhanced by considering expected mismatch based on the probability of future events.

Figure 3:
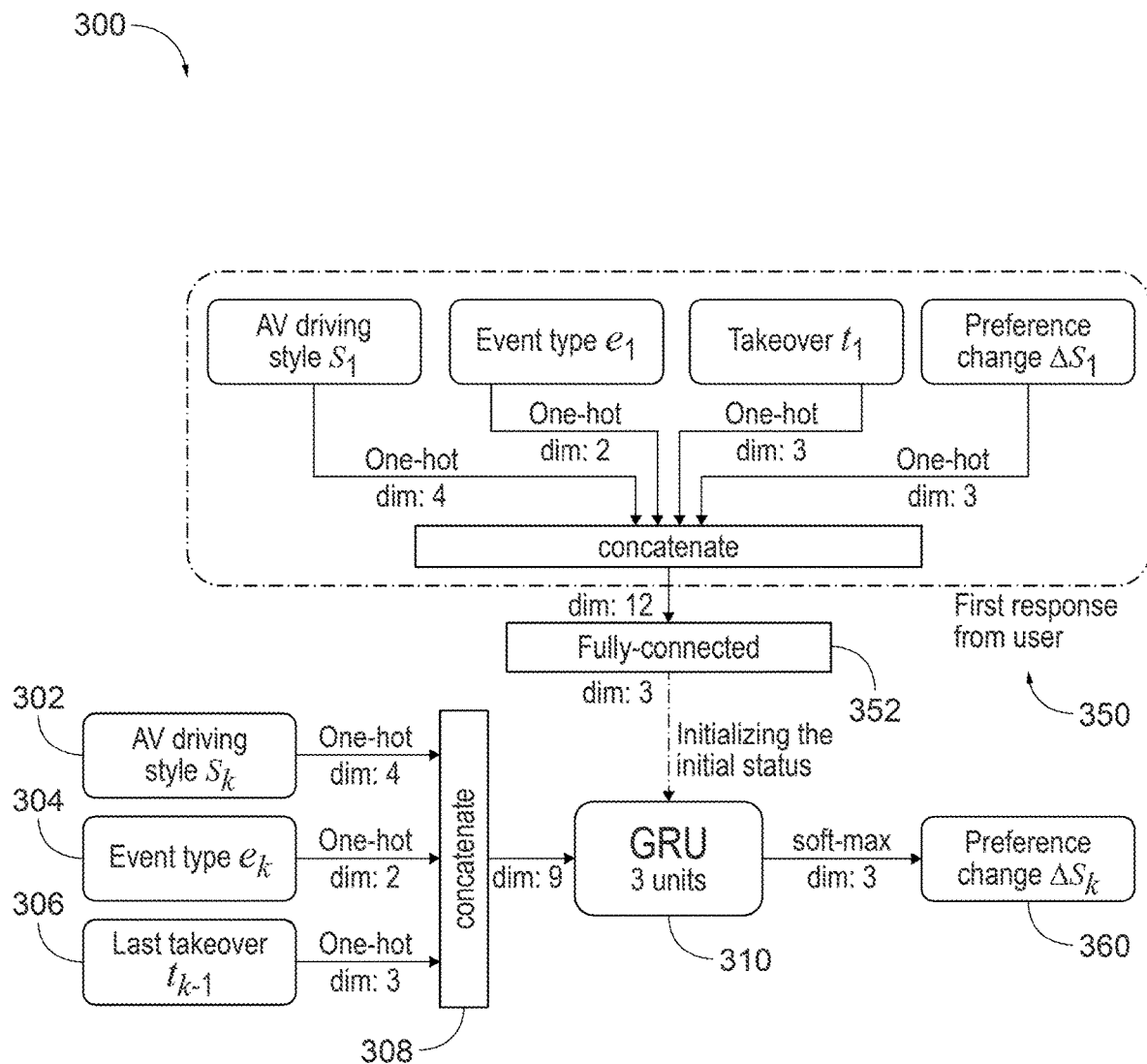
FIG. 3 is an exemplary architecture associated with the system for adaptive trust calibration of FIGS. 1-2, according to one aspect.

FIG. 3 is an exemplary architecture 300 associated with the system 100 for adaptive trust calibration of FIGS. 1-2, according to one aspect. As seen in FIG. 3, the driving style predictor 110 architecture may be initialized via an initial response 350 from a user and this input may be passed through a fully-connected layer 352. The initial response 350 may include an initial AV driving style, an initial event and an associated initial event type, an indication of an initial driver takeover, or an initial preference change. The initial AV driving style, initial event and associated initial event type, indication of an initial driver takeover, and initial preference change may be concatenated and passed through the fully-connected layer 352 to the neural network 310, which may be the same neural network as the neural network 118 of FIG. 1. As discussed above, the architecture 300 of FIG. 3 may be implemented remote from the AV.

Two or more of a current AV driving style 302, an indication of an event and an associated event type 304, or an indication of a driver takeover 306 may be received by the processor of the driving style predictor 110 or the preferred driving style change predictor. Two or more of the received parameters (e.g., the current AV driving style 302, the indication of an event and an associated event type 304, or the indication of a driver takeover 306) may be concatenated 308 to generate the input for the neural network and this concatenation 308 may be a representation indicative of a state of an occupant or user of the AV. The processor may pass the input through the neural network 310 to generate the preference change 360 associated with the AV driving style. Again, although the neural network 310 is depicted as a gated recurrent unit (GRU), any type of neural network may be implemented.

Figure 4:
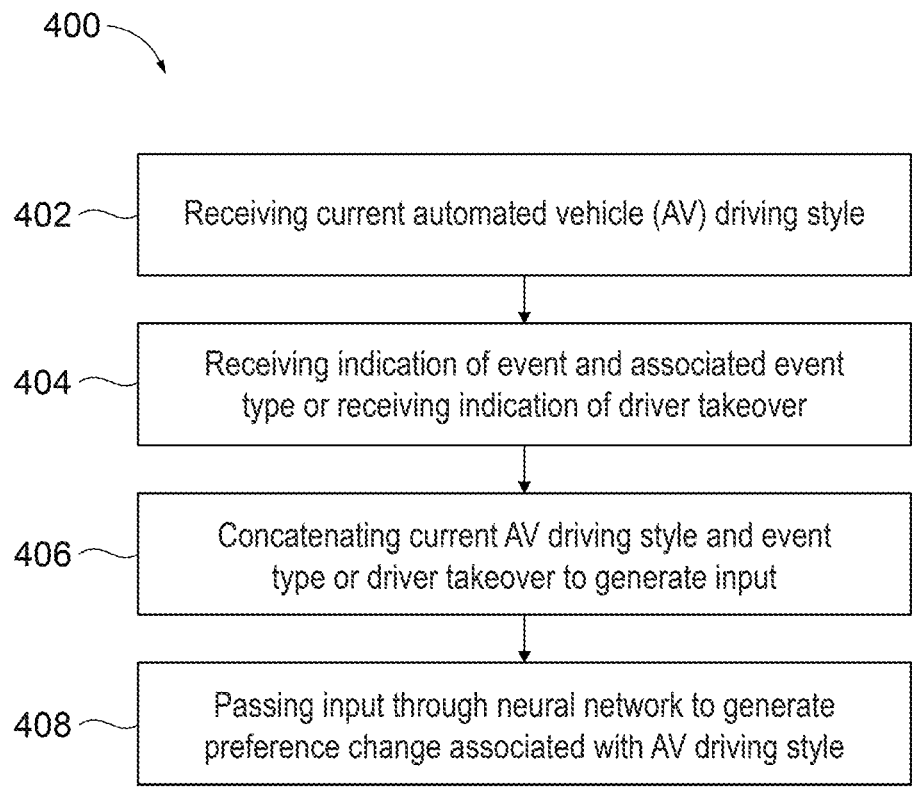
FIG. 4 is an exemplary flow diagram of a method for adaptive trust calibration, according to one aspect.

FIG. 4 is an exemplary flow diagram of a method 400 for adaptive trust calibration, according to one aspect. The method may include receiving 402 a current AV driving style, receiving 404 an indication of an event and an associated event type or receiving an indication of a driver takeover, concatenating 406 the current AV driving style and one or more of the event type or the driver takeover to generate an input, and passing 408 the input through a neural network to generate a preference change associated with the AV driving style.

Figure 5:
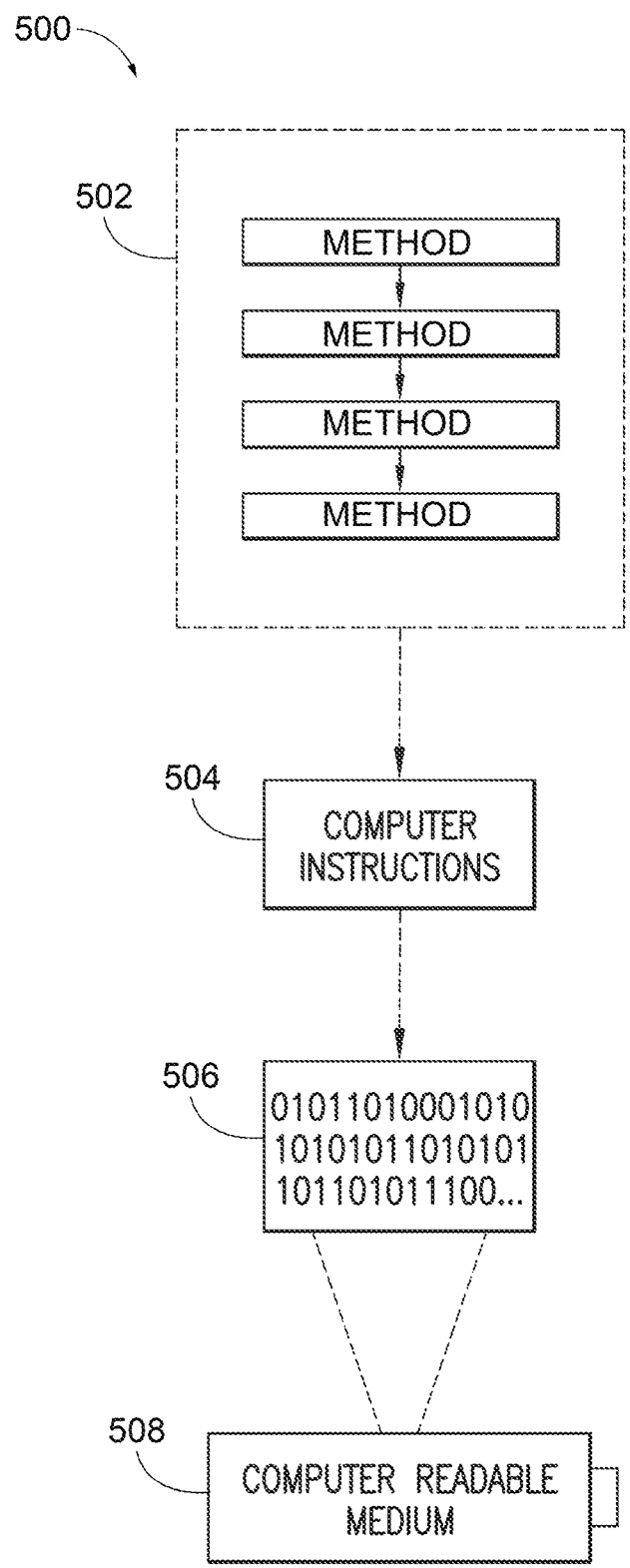
FIG. 5 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This encoded computer-readable data 506, such as binary data including a plurality of zero's and one's as shown in 506, in turn includes a set of processor-executable computer instructions 504 configured to operate according to one or more of the principles set forth herein. In this implementation 500, the processor-executable computer instructions 504 may be configured to perform a method 502, such as the method 400 of FIG. 4. In another aspect, the processor-executable computer instructions 504 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
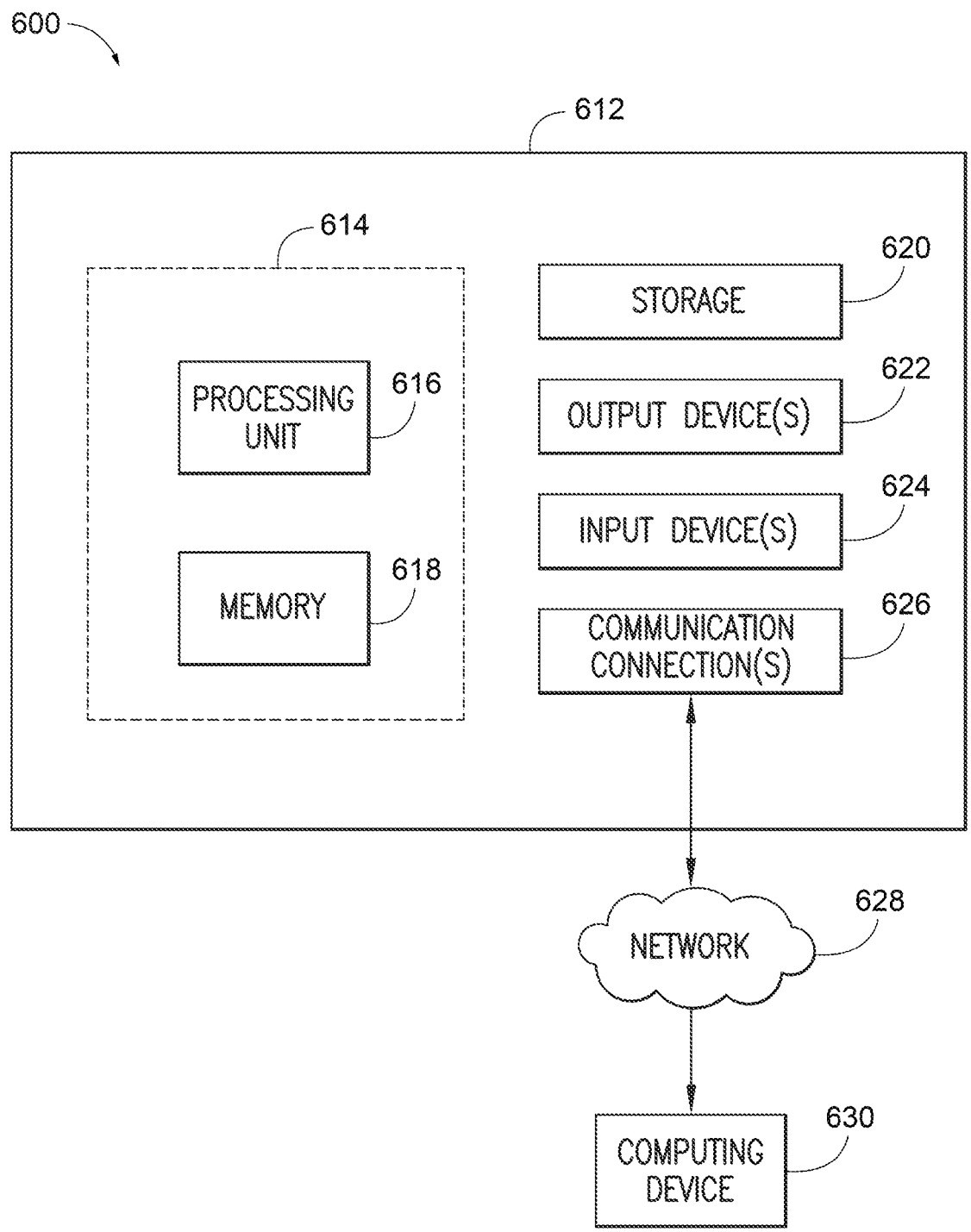
FIG. 6 is an illustration of an example computing environment where one or more of the provisions set forth herein are implemented, according to one aspect.

FIG. 6 and the following discussion provide a description of a suitable computing environment to implement aspects of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 612 configured to implement one aspect provided herein. In one configuration, the computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other aspects, the computing device 612 includes additional features or functionality. For example, the computing device 612 may include additional storage such as removable storage or non-removable storage, including, but not limited to, magnetic storage, optical storage, etc. Such additional storage is illustrated in FIG. 6 by storage 620. In one aspect, computer readable instructions to implement one aspect provided herein are in storage 620. Storage 620 may store other computer readable instructions to implement an operating system, an application program, etc. Computer readable instructions may be loaded in memory 618 for execution by the at least one processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 612. Any such computer storage media is part of the computing device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 612 includes input device(s) 624 such as keyboard, mouse, pen, voice input device, touch input device, infrared cameras, video input devices, or any other input device. Output device(s) 622 such as one or more displays, speakers, printers, or any other output device may be included with the computing device 612. Input device(s) 624 and output device(s) 622 may be connected to the computing device 612 via a wired connection, wireless connection, or any combination thereof. In one aspect, an input device or an output device from another computing device may be used as input device(s) 624 or output device(s) 622 for the computing device 612. The computing device 612 may include communication connection(s) 626 to facilitate communications with one or more other devices 630, such as through network 628, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for adaptive trust calibration, comprising:
a driving style predictor including:
a memory storing one or more instructions; and
a processor executing one or more of the instructions stored on the memory to perform:
receiving a current automated vehicle (AV) driving style;
receiving an indication of an event and an associated event type;
concatenating the current AV driving style and the event type to generate an input; and
passing the input through a neural network to generate a preference change associated with the AV driving style.

2. The system for adaptive trust calibration of claim 1, comprising a driving style controller, implementing the preference change and generating an updated AV driving style.

3. The system for adaptive trust calibration of claim 2, comprising a driving automation controller operating an AV by implementing the updated AV driving style.

4. The system for adaptive trust calibration of claim 3, wherein the driving automation controller includes a Stanley controller generating a steering output based on the event.

5. The system for adaptive trust calibration of claim 3, wherein the driving automation controller includes an intelligent driver model (IDM) controller generating throttle and brake outputs based on the event.

6. The system for adaptive trust calibration of claim 1, wherein the processor receives an indication of a driver takeover.

7. The system for adaptive trust calibration of claim 6, wherein the processor concatenates the current AV driving style, the event type, and the driver takeover to generate the input.

8. The system for adaptive trust calibration of claim 1, wherein the neural network is a recurrent neural network or a gated recurrent unit (GRU).

9. The system for adaptive trust calibration of claim 1, wherein the driving style predictor is initialized based on an initial AV driving style, an initial event and an associated initial event type, an indication of an initial driver takeover, or an initial preference change.

10. The system for adaptive trust calibration of claim 9, wherein the initial preference change is received as a user input.

11. A system for adaptive trust calibration, comprising:
a driving style predictor including:
a memory storing one or more instructions; and
a processor executing one or more of the instructions stored on the memory to perform:
receiving a current automated vehicle (AV) driving style;
receiving an indication of a driver takeover;
concatenating the current AV driving style and the driver takeover to generate an input; and
passing the input through a neural network to generate a preference change associated with the AV driving style.

12. The system for adaptive trust calibration of claim 11, comprising a driving style controller, implementing the preference change and generating an updated AV driving style.

13. The system for adaptive trust calibration of claim 12, comprising a driving automation controller operating an AV by implementing the updated AV driving style.

14. The system for adaptive trust calibration of claim 13, wherein the driving automation controller includes a Stanley controller generating a steering output based on a detected event and an intelligent driver model (IDM) controller generating throttle and brake outputs based on the detected event.

15. A method for adaptive trust calibration, comprising:
receiving a current automated vehicle (AV) driving style;
receiving an indication of an event and an associated event type or receiving an indication of a driver takeover;
concatenating the current AV driving style and one of the event type or the driver takeover to generate an input; and
passing the input through a neural network to generate a preference change associated with the AV driving style.

16. The method for adaptive trust calibration of claim 15, comprising implementing the preference change and generating an updated AV driving style.

17. The method for adaptive trust calibration of claim 16, comprising operating an AV by implementing the updated AV driving style.

18. The method for adaptive trust calibration of claim 17, comprising generating a steering output based on the event.

19. The method for adaptive trust calibration of claim 17, comprising generating throttle and brake outputs based on the event.

20. The method for adaptive trust calibration of claim 15, wherein the event type is one of a pedestrian related event or a vehicle related event.

* * * * *